INVENTOR.
WALLACE T. BALLOR

ATTORNEYS

# United States Patent Office 2,818,797
Patented Jan. 7, 1958

2,818,797

FRUIT AND VEGETABLE PRESS

Wallace T. Ballor, Lemon Grove, Calif., assignor of one-third to Warren H. F. Schmieding, San Diego, Calif.

Application July 9, 1954, Serial No. 442,365

1 Claim. (Cl. 100—98)

The present invention relates to a fruit or vegetable press and more particularly to a press for crushing dense and tough vegetables such as garlic bulbs.

One of the objects of the present invention is to provide a press in which fruit or vegetable is forced under pressure against a series of knife edges.

In carrying out the foregoing object, I provide a core having a plurality of passages extending therethrough for permitting the escape of juice or particles which, before the extrusion, had composed the fruit or vegetable; the core also including sharpened edges disposed adjacent the entrances to the openings in the core.

Further objects and advantages will be apparent from the following description, reference being had to the accompanying drawings wherein preferred embodiments of the invention are illustrated.

Figure 1:
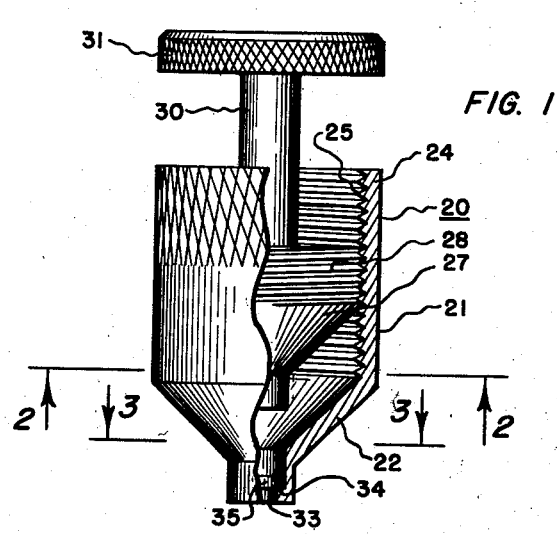
Fig. 1 is a side view of the improved press, part thereof being shown in section to more clearly show the plunger.
Figure 2:
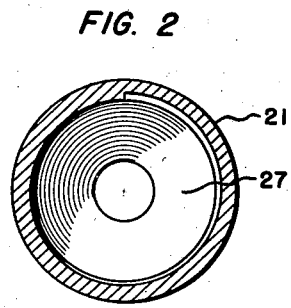
Fig. 2 is a sectional view taken on line 2—2 of Fig. 1.

Referring more in detail to the drawings, the press 20 includes a main container 21. This container 21 is annularly shaped and includes tapered bottom section 22. The upper portion 24 is internally threaded as at 25 to receive a plunger 27, which is externally threaded as at 28 to complement the thread 25 of the portion 24. The plunger 27 carries an upwardly extending stem 30 which is turned by a knurled handle 31.

The section 22 of container 21 is provided with an opening 33 in the extreme bottom thereof. A countersink is formed about this opening to form an upwardly extending shoulder 34. A core 35 is suitably secured in the opening 33. This core is provided with a flange 36 which forms a downwardly extending shoulder 37, which is arranged to abut the shoulder 34 on the container. Preferably, this core, as well as the container 21, are formed of metal. A plurality of passages 38, arranged parallelly of the axis and at right angles to the flat bottom of the plunger 27, extend through the core 35. The juices or particles pass from the interior of the container through these passages. These passages 38 may be formed by drilling. Some fruits and vegetables are quite dense and tough and therefore are difficult to crush—among these is garlic. I have found that garlic can be crushed into minute particles, in a press that can be readily manipulated by two hands, by causing the buds or cloves to be pressed against knife edges.

Figure 3:
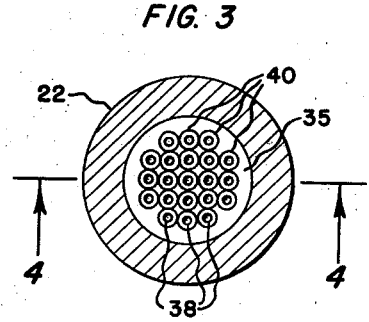
Fig. 3 is a sectional view taken on line 3—3 of Fig. 1, but on a larger scale than that shown in Fig. 1.
Figure 4:
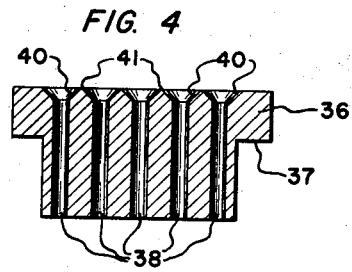
Fig. 4 is a sectional view of the cylindrical core shown in Figs. 2 and 3, but on a scale substantially twice the size of that shown in Fig. 3.

In one embodiment of the invention, I form these knife edges by bevel-countersinking the upper surface of the core 35 about the openings 38, the countersinking being sufficient to effect tangential contact of the adjacent counter-sink sections. This embodiment is shown in Figs. 3 and 4, the countersunk surfaces are shown at 40 and the knife edges are shown at 41.

Figure 5:
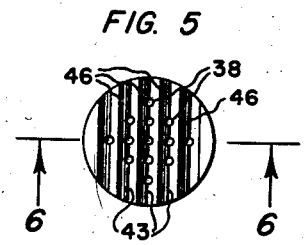
Fig. 5 is another form of core.
Figure 6:
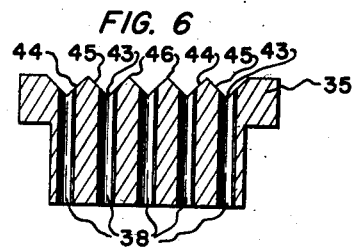
Fig. 6 is a sectional view taken on line 6—6 of Fig. 5, but on a scale substantially twice the size of that shown in Fig. 5.

Another manner of forming the knife edges is by drilling a series of aligned holes 38, as shown in Fig. 5, and then milling a series of V-shaped grooves 43 in the top surface of the core 35, as shown in Figs. 5 and 6. These V-shaped grooves 43 extend through aligned holes, and the milling is sufficient so that adjacent faces 44 and 45 and adjacent grooves intersect one another to form the knife edges 46. By constructing the knives as herein shown, the base surfaces thereof are sufficient to withstand the pressure necessary to pierce or cut the vegetable. Also, by the use of these knife edges, the vegetables can be easily crushed and severed by the force of the hands of a child or housewife.

While the forms of embodiment herein shown and described constitute preferred forms, it is to be understood that other forms may be adopted falling within the scope of the claim that follows:

I claim:

A vegetable press having a container for the vegetable, said container having a bottom wall, said bottom wall having an opening; a rotatable plunger within the container, said plunger having a substantially flat bottom at right angles to the direction of axial movement of the plunger; means for simultaneously rotating and moving the plunger downwardly for compressing the vegetable therebelow; means within the opening forming a plurality of passages arranged parallelly of the axis of the plunger and leading from the interior of the container and forming a plurality of knife sections having their cutting edges facing upwardly, all of said cutting edges terminating in a flat plane lying parallelly with the plane of the bottom of the plunger, said passages comprising a plurality of series of aligned holes passing parallel to the axis of the plunger through said means, there being V-shaped grooves in the upper surface of said means intersecting said aligned holes, adjacent faces of adjacent grooves intersecting one another along respective lines defining said knife edges.

References Cited in the file of this patent

UNITED STATES PATENTS

| 127,427 | Potter | June 4, 1872 |
| 310,336 | Unger | Jan. 6, 1885 |
| 491,671 | Atkinson | Feb. 14, 1893 |
| 577,976 | Carter | Mar. 2, 1897 |
| 762,128 | Bourquin | June 7, 1904 |
| 968,848 | Himebaugh | Aug. 30, 1910 |
| 1,443,255 | Gilbert | Jan. 23, 1923 |
| 1,496,917 | Baerenfaenger | June 10, 1924 |
| 1,512,644 | Smith | Oct. 21, 1924 |
| 2,018,932 | Thorne | Oct. 29, 1935 |
| 2,306,884 | Jakovicz | Dec. 29, 1942 |

FOREIGN PATENTS

| 1,817 | Great Britain | 1898 |
| 149,044 | Switzerland | Nov. 2, 1931 |
| 240,214 | Switzerland | Mar. 16, 1946 |